United States Patent
Nammi et al.

(10) Patent No.: US 12,068,822 B2
(45) Date of Patent: Aug. 20, 2024

(54) FACILITATING FAST CHANNEL STATE INFORMATION COMPUTATION FOR 5G WIRELESS COMMUNICATION SYSTEMS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 589 days.

(21) Appl. No.: 17/346,167

(22) Filed: Jun. 11, 2021

(65) Prior Publication Data

US 2021/0314047 A1 Oct. 7, 2021

Related U.S. Application Data

(63) Continuation of application No. 16/357,798, filed on Mar. 19, 2019, now Pat. No. 11,057,092.

(Continued)

(51) Int. Cl.
*H04W 24/10* (2009.01)
*H04B 7/06* (2006.01)
(Continued)

(52) U.S. Cl.
CPC ......... *H04B 7/0626* (2013.01); *H04B 7/0632* (2013.01); *H04L 1/0026* (2013.01);
(Continued)

(58) Field of Classification Search
CPC ... H04B 7/0626; H04B 7/0632; H04L 1/0026; H04W 24/10
See application file for complete search history.

(56) References Cited

U.S. PATENT DOCUMENTS 8,705,482 B2 4/2014 Sun et al.
9,083,479 B2 7/2015 Etemad et al.
(Continued)

OTHER PUBLICATIONS

Nakamura, Takehiro, et al. "5G Radio Access: Requirements, Concept and Experimental Trials." IEICE Transactions on Communications 98.8 (2015): 1397-1406. 10 pages. https:/ /www.jstage.jst.go.jp/article/transcom/E98.B/8/E98.B_1397/_pdf.

(Continued)

*Primary Examiner* — Jamal Javaid
(74) *Attorney, Agent, or Firm* — Guntin & Gust, PLC; Miyoung Shin

(57) ABSTRACT

Fast calculation of channel state information using demodulation reference signals (DM-RS) is provided herein. Channel state information is traditionally calculated based on the channel state reference signals (CS-RS). Demodulation reference signals, which are used for channel estimation for a data channel, are transmitted at different times than CS-RS however, and so some portions of the channel state information including layer indicator (LI) and channel quality indicator (CQI) can be calculated based on the demodulation reference signals, allowing a network to adapt more quickly to changing channel conditions, without having to transmit a CS-RS. Generally, precoding matrix indicator and rank indicator, which cannot be determined based on the DM-RS, don't change as often and are more stable over time, thus do not need to be calculated as frequently as the LI and CQI.

20 Claims, 12 Drawing Sheets

Related U.S. Application Data

(60) Provisional application No. 62/717,207, filed on Aug. 10, 2018.

(51) Int. Cl.
  H04L 1/00 (2006.01)
  H04L 1/1812 (2023.01)
  H04W 88/02 (2009.01)

(52) U.S. Cl.
  CPC ........... H04L 1/1812 (2013.01); H04W 24/10 (2013.01); H04W 88/02 (2013.01)

(56) References Cited

U.S. PATENT DOCUMENTS

| | | |
|---|---|---|
| 9,225,478 B2 | 12/2015 | Chen et al. |
| 9,264,997 B2 | 2/2016 | Gaal et al. |
| 9,313,747 B2 | 4/2016 | Zhu et al. |
| 9,363,700 B2 | 6/2016 | Su et al. |
| 9,544,112 B2 | 1/2017 | Park |
| 9,608,785 B2 | 3/2017 | Kim et al. |
| 9,641,236 B2 | 5/2017 | Hammarwall et al. |
| 9,642,121 B2 | 5/2017 | Song et al. |
| 9,668,207 B2 | 5/2017 | Ostergaard et al. |
| 9,681,325 B2 | 6/2017 | Chen et al. |
| 9,723,558 B2 | 8/2017 | Xu et al. |
| 9,793,971 B2 | 10/2017 | Ko et al. |
| 9,900,074 B2 | 2/2018 | Mallik et al. |
| 10,020,969 B2 | 7/2018 | Novlan et al. |
| 10,028,315 B2 | 7/2018 | Uchino et al. |
| 10,039,130 B2 | 7/2018 | Lopez-perez et al. |
| 2012/0147773 A1 | 6/2012 | Kim et al. |
| 2014/0301238 A1 | 10/2014 | Chun et al. |
| 2016/0105265 A1 | 4/2016 | Wang et al. |
| 2017/0005764 A1 | 1/2017 | Park et al. |
| 2017/0111098 A1 | 4/2017 | Kim et al. |
| 2017/0288743 A1 | 10/2017 | Nam et al. |
| 2017/0311188 A1 | 10/2017 | Sun et al. |
| 2017/0353976 A1 | 12/2017 | Yerramalli et al. |
| 2018/0019853 A1 | 1/2018 | Aiba et al. |
| 2018/0123654 A1 | 5/2018 | Park et al. |
| 2019/0007181 A1* | 1/2019 | Marinier ................ H04L 5/0051 |
| 2019/0123881 A1* | 4/2019 | Lee ........................ H04L 1/1822 |

OTHER PUBLICATIONS

Lopez-Perez, David, et al. "Towards 1 Gbps/UE in Cellular Systems: Understanding Ultra-Dense Small Cell Deployments." IEEE Communications Surveys & Tutorials 17.4 (2015): 2078-2101. 23 pages. https://arxiv.org/pdf/1503.03912.

Mustafa, Hafiz, et al. "Separation Framework: An Enabler for Cooperative and D2D Communication for Future 5G Networks." IEEE Communications Surveys & Tutorials 18.1 (2016): 419-445. https://arxiv.org/pdf/1604.02636.

Eduardo, et al. "Link Adaptation Strategies for Cellular Downlink with low-fixed-rate D2D Underlay." (2014). 69 pages. http://projekter.aau.dk/projekter/files/204198834/LA_downlink_D 2D_underlay.pdf.

International Search Report and Written Opinion received for PCT Application Serial No. PCT/US2019/042856 dated Oct. 23, 2019, 17 pages.

Huawei et al., "CSI feedback enhancements for URLLC", URL: http://www.3gpp.org/ftp/Meetings%5F3GPP%5FSYNC/RAN1/Docs/, 3GPPTSG RAN WG1 Meeting #92bis, R1-1804289, Apr. 16-20, 2018, 5 pages.

International Preliminary Report on Patentability received for PCT Application Serial No. PCT/US2019/042856 dated Feb. 25, 2021, 10 pages.

Office Action dated Apr. 24, 2020 for U.S. Appl. No. 16/357,798, 39 pages.

Office Action dated Sep. 3, 2020 for U.S. Appl. No. 16/357,798, 30 pages.

* cited by examiner

FACILITATING FAST CHANNEL STATE INFORMATION COMPUTATION FOR 5G WIRELESS COMMUNICATION SYSTEMS

RELATED APPLICATIONS

The subject patent application is a continuation of, and claims priority to, U.S. patent application Ser. No. 16/357,798, filed Mar. 19, 2019, and entitled "FACILITATING FAST CHANNEL STATE INFORMATION COMPUTATION FOR 5G WIRELESS COMMUNICATION SYSTEMS," which applications claim the benefit of priority to U.S. Provisional Patent Application No. 62/717,207, filed Aug. 10, 2018 and titled "FAST CSI COMPUTATION FOR 5G WIRELESS COMMUNICATION SYSTEMS" the entireties of which applications are hereby incorporated herein by reference.

TECHNICAL FIELD

This disclosure relates generally to facilitating fast channel state information (CSI) computation for 5G wireless communication systems. For example, this disclosure relates to facilitating fast calculation of channel state information using demodulation reference signals (DM-RS) for a 5G, or other next generation network, air interface.

BACKGROUND $5^{th}$ generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating fast CSI computation is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
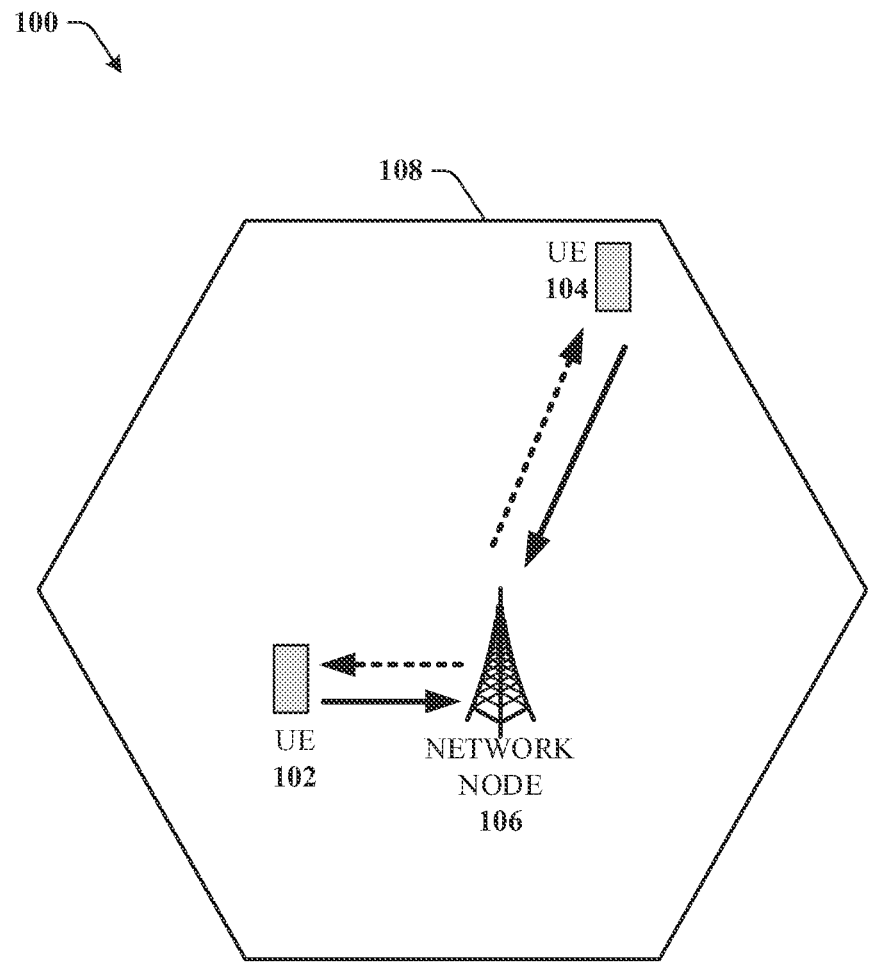
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate fast CSI computation for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate fast CSI computation for a 5G network. Facilitating fast CSI computation for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

A physical downlink control channel (PDCCH) can carry information about scheduling grants. Typically, this comprises a of number of multiple-in multiple-out (MIMO) layers scheduled, transport block sizes, modulation for each code word, parameters related to a hybrid automatic repeat request (HARQ), sub band locations etc. It should be noted that all downlink control information (DCI) formats may not transmit all the information as shown above. In general, the contents of PDCCH can depend on a transmission mode and a DCI format. Typically, the following information is transmitted by means of the DCI format: carrier indicator, identifier for dci formats, bandwidth part indicator, frequency domain resource assignment, time domain resource assignment, virtual resource block (VRB) to physical resource block (PRB) mapping flag, PRB bundling size indicator, rate matching indicator, zero-punctuation (ZP) CSI-RS trigger, modulation and coding scheme for each transport block (TB), new data indicator for each TB, redundancy version for each TB, HARQ process number, downlink assignment index, transaction processing benchmark (TPC) command for uplink control channel, physical uplink control channel (PUCCH) resource indicator, physical downlink scheduling channel to HARQ feedback timing indicator, antenna port(s), transmission configuration indication, system requirement specification (SRS) request, codeblock group (CBG) transmission information, CBG flushing out information, and/or demodulation reference signal (DMRS) sequence initialization.

The uplink control channel can carry information about HARQ-acknowledgment (ACK) information corresponding to the downlink data transmission, and channel state information. The channel state information typically comprises: CRI, RI, CQI, PMI and layer indicator data, etc. The CSI can be divided into two categories: one for sub-band and the other for wideband. The configuration of sub-band or wideband CSI reporting can be done through RRC signaling as part of CSI reporting configuration. Table 1 depicts the contents of a CSI report for PMI format indicator=Wideband, CQI format indicator=wideband and for PMI format indicator=sub-band, CQI format indicator=sub-band.

TABLE 1

Contents of CSI report for both wideband and side band

| PMI-Format Indicator = wideband PMI and | PMI-Format Indicator = sub-band PMI or CQI-Format Indicator = sub-band CQI | | |
|---|---|---|---|
| CQI-Format Indicator = | | CSI Part II | |
| wideband CQI | CSI Part I | wideband | sub-band |
| CRI | CRI | Wideband CQI for the second TB | Sub-band differential CQI for the |

TABLE 1-continued

Contents of CSI report for both wideband and side band

| PMI-Format Indicator = wideband PMI and CQI-Format Indicator = wideband CQI | PMI-Format Indicator = sub-band PMI or CQI-Format Indicator = sub-band CQI | | |
|---|---|---|---|
| | CSI Part I | CSI Part II | |
| | | wideband | sub-band |
| Rank Indicator | Rank Indicator | PMI wideband (X1 and X2) | second TB (transport block) of all even sub-bands PMI sub-band information fields X₂ of all even sub-bands |
| Layer Indicator | Layer Indicator | — | Sub-band differential CQI for the second TB of all odd sub-bands |
| PMI wideband (X1 and X2) | Wideband CQI | — | PMI sub-band information fields X₂ of all odd sub-bands |
| Wideband CQI | Sub-band differential CQI for the first TB | — | — |

Note that for NR, the sub-band is defined according to the bandwidth part of the OFDM in terms of PRBs as shown in Table 2. The sub-band configuration is also done through RRC signaling.

TABLE 2

Configurable sub-band sizes

| Carrier bandwidth part (PRBs) | Sub-band Size (PRBs) |
|---|---|
| <24 | N/A |
| 24-72 | 4, 8 |
| 73-144 | 8, 16 |
| 145-275 | 16, 32 |

Based on the existing 5G NR standard, the UE should report sub band CQI as a differential CQI to reduce the uplink overhead. For each sub-band index s, a 2-bit sub-band differential CQI is defined as:

Sub-band Offset level (s)=wideband CQI index−sub-band CQI index (s)    Equation 1):

The mapping from the 2-bit wideband differential CQI values to the offset level is shown in Table 3 below:

TABLE 3

Mapping sub band differential CQI value to offset level

| Sub band differential CQI value | Offset level |
|---|---|
| 0 | 0 |
| 1 | 1 |
| 2 | ≥2 |
| 3 | ≤−1 |

The following table summarizes the CSI-RS configuration and the CSI reporting. For CSI reporting, CSI-RS transmission as well as a signaling from the network to the UE can be observed.

TABLE 4

Triggering/Activation of CSI Reporting for the Possible CSI-RS Configurations

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command; for reporting on PUSCH, the UE receives triggering on DCI | Triggered by DCI, additionally, activation command |
| Semi-Persistent CSI-RS | Not Supported | For reporting on PUCCH, the UE receives an activation command; for reporting on PUSCH, the UE additionally receives triggering on DCI | Triggered by DCI, additionally, activation command |
| Aperiodic CSI-RS | Not Supported | Not Supported | Triggered by DCI, additionally, activation command |

This disclosure proposes methods to compute the CSI using the scheduled PDSCH and DM-RS, thereby reducing the overhead for CSI computation. In addition, a signaling mechanism can be used for reporting simultaneous HARQ-ACK and CQI reporting using sequences. This disclosure comprises multiple embodiments, which can be implemented at the network node and/or at the UE. For example, at the UE, a method can be used to report CSI using DMRS and PDSCH based channel estimation. Additionally, at the UE, a method can be used to indicate the simultaneous HARQ-ACK and CQI. At the network, a method can indicate the DMRS based CSI request.

The aforementioned methods can result in significant gains in sector throughput and cell edge user throughput as the network obtains the information about the CQI efficiently and a reduction in the signaling overhead. It should be noted that although this disclosure describes the embodiments with relation to downlink data transmission for MIMO systems, the same principle is applicable for uplink and side link systems.

In one embodiment, described herein is a user equipment device that can facilitate performance of operations comprising receiving a demodulation reference signal to facilitate channel estimation for a data channel of a communication link with a network node device. Based on the demodulation reference signal, the user equipment device can facilitate performance of operations comprising receiving determining channel state information relating to the data channel. Additionally, in response to the determining the channel state information, the user equipment device can facilitate performance of operations comprising transmitting the channel state information to the network node device.

According to another embodiment, a node device can facilitate performance of operations comprising transmitting a request to a user equipment device to determine channel state information based on a demodulation reference signal. The node device can facilitate performance of operations comprising receiving, from the user equipment device, the channel state information. Based on the channel state information, the node device can facilitate performance of operations comprising determining a parameter for a data channel transmission to the user equipment device. Furthermore, the node device can facilitate performance of operations comprising transmitting the parameter to the user equipment device via a downlink control channel.

According to yet another embodiment, described herein is a machine-readable storage medium that can perform the operations comprising receiving a demodulation reference signal to facilitate channel estimation for a data channel of a communication link with a network node device. The machine-readable storage medium can perform the operations comprising receiving a physical downlink shared channel signal to facilitate channel estimation for the data channel of the communication link with the network node device. In response to the receiving the demodulation reference signal and the physical downlink shared channel signal, the machine-readable storage medium can perform the operations comprising estimating channel state data. Additionally, in response to the estimating the channel state data, the machine-readable storage medium can perform the operations comprising transmitting the channel state data to the network node device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 106. The network node (e.g., network node device) can communicate with user equipment (UE), thus providing connectivity between the UE and the wider cellular network. The UE 102 can send transmission type recommendation data to the network node 106. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 106. The dashed arrow lines from the network node 106 to the UE 102 represent downlink (DL) communications and the solid arrow lines from the UE 102 to the network nodes 106 represents an uplink (UL) communication.

System 100 can further include one or more communication service provider networks 108 that facilitate providing wireless communication services to various UEs, including UE 102, via the network node 106 and/or various additional network devices (not shown) included in the one or more communication service provider networks 108. The one or more communication service provider networks 108 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 108 can be or include the wireless communication network and/or various additional devices and components of the wireless communication network (e.g., additional network devices and cell, additional UEs, network server devices, etc.). The network node 106 can be connected to the one or more communication service provider networks 108 via one or more backhaul links. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 106). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
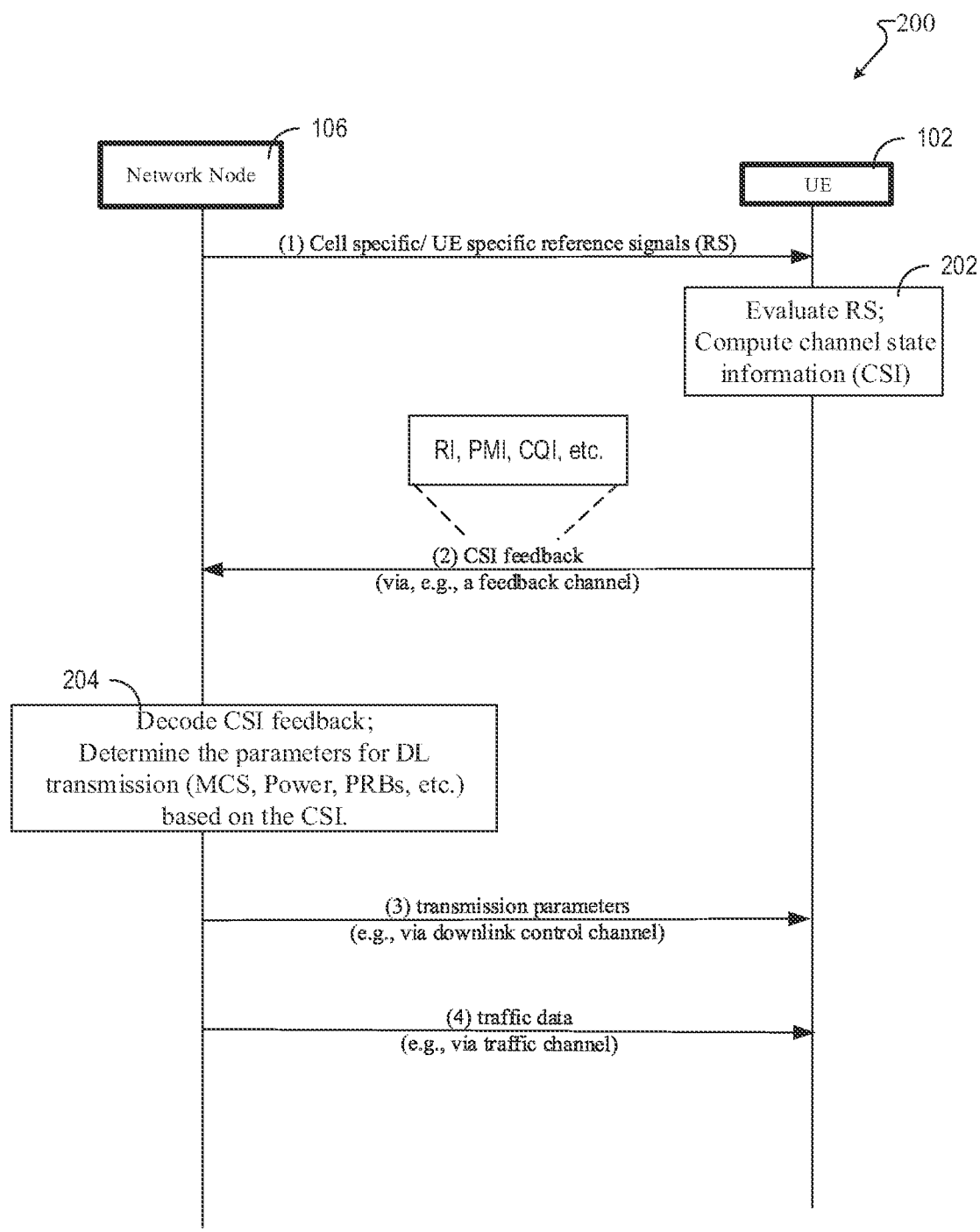
FIG. 2 illustrates an example schematic system block diagram of a message sequence chart between a network node and user equipment according to one or more embodiments.

Referring now to FIG. 2, illustrated is an example schematic system block diagram of a message sequence chart between a network node and user equipment according to one or more embodiments.

FIG. 2 depicts a message sequence chart for downlink data transfer in 5G systems 200. The network node 106 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 106 via a feedback channel either on request from the network node 106, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 106 and then sent over to the user equipment 102 as a part of the downlink control channel data. The network node 106 can transmit the scheduling parameters, comprising the adjusted densities, to the user equipment 102 via the downlink control channel. Thereafter and/or simultaneously, data can be transferred, via a data traffic channel, from the network node 106 to the user equipment 102.

Figure 3:
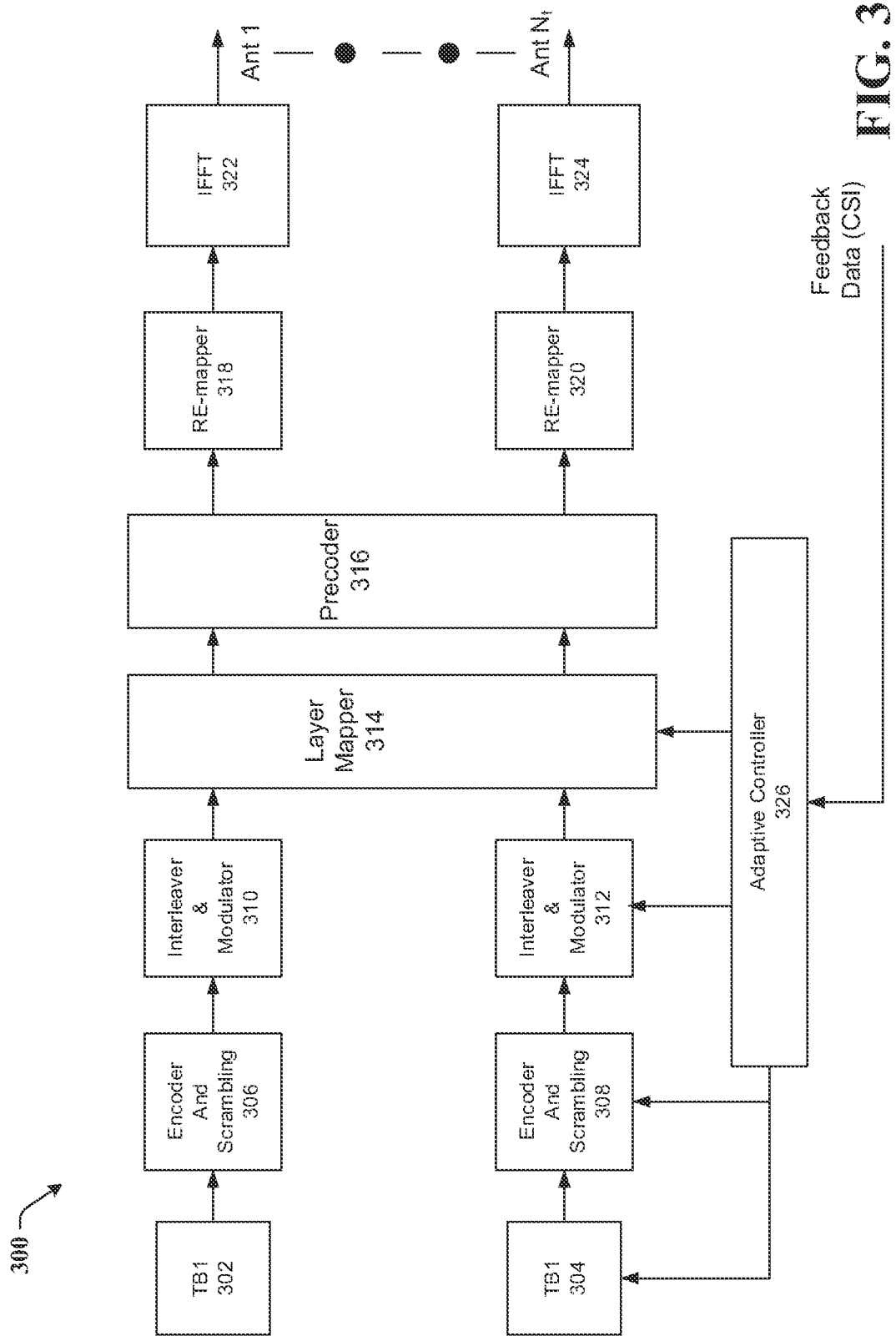
FIG. 3 illustrates an example schematic system block diagram of a coding chain for a physical downlink shared channel transmitter according to one or more embodiments.

Referring now to FIG. 3, illustrated is an example schematic system block diagram of a coding chain for a physical downlink shared channel transmitter according to one or more embodiments. FIG. 3 depicts the transmission side of a MIMO communication system 300 with $N_t$ transmit antennas. There are up to 2 transport blocks 302, 304 where the number of transport blocks can be equal to one when the number of layers is less than or equal to 4. If the number of layers is more than 4, then 2 transport blocks can be transmitted. The cyclic redundancy check (CRC) bits can be added to each transport block and passed to the channel encoder 306, 308. Low-density parity check codes (LDPC) can be used for forward error correction (FEC) in NR. The channel encoder 306, 308 can add parity bits to protect the data. After encoding, the data stream can be scrambled with user-specific scrambling. Then, the stream can be passed through an interleaver 310, 312.

The interleaver size can be adaptively controlled by puncturing to increase the data rate. The adaptation can be performed by using the information from the feedback channel (e.g., channel state information sent by the receiver). The interleaved data can be passed through a symbol mapper (modulator). The symbol mapper can also be controlled by the adaptive controller 326, after the modulator streams are passed through a layer mapper 314 and the precoder 316. The resultant symbols can be mapped at resource element (RE) mappers 318, 320 to the resource elements in a time-frequency grid of OFDM. The resultant streams can then be passed through an inverse fast fourier transform (IFFT) block 322, 324. It should be noted that in some systems, the IFFT block may not be necessary and can be dependent on the multiple access system. The encoded stream can then be transmitted through the respective antenna.

Figure 4:
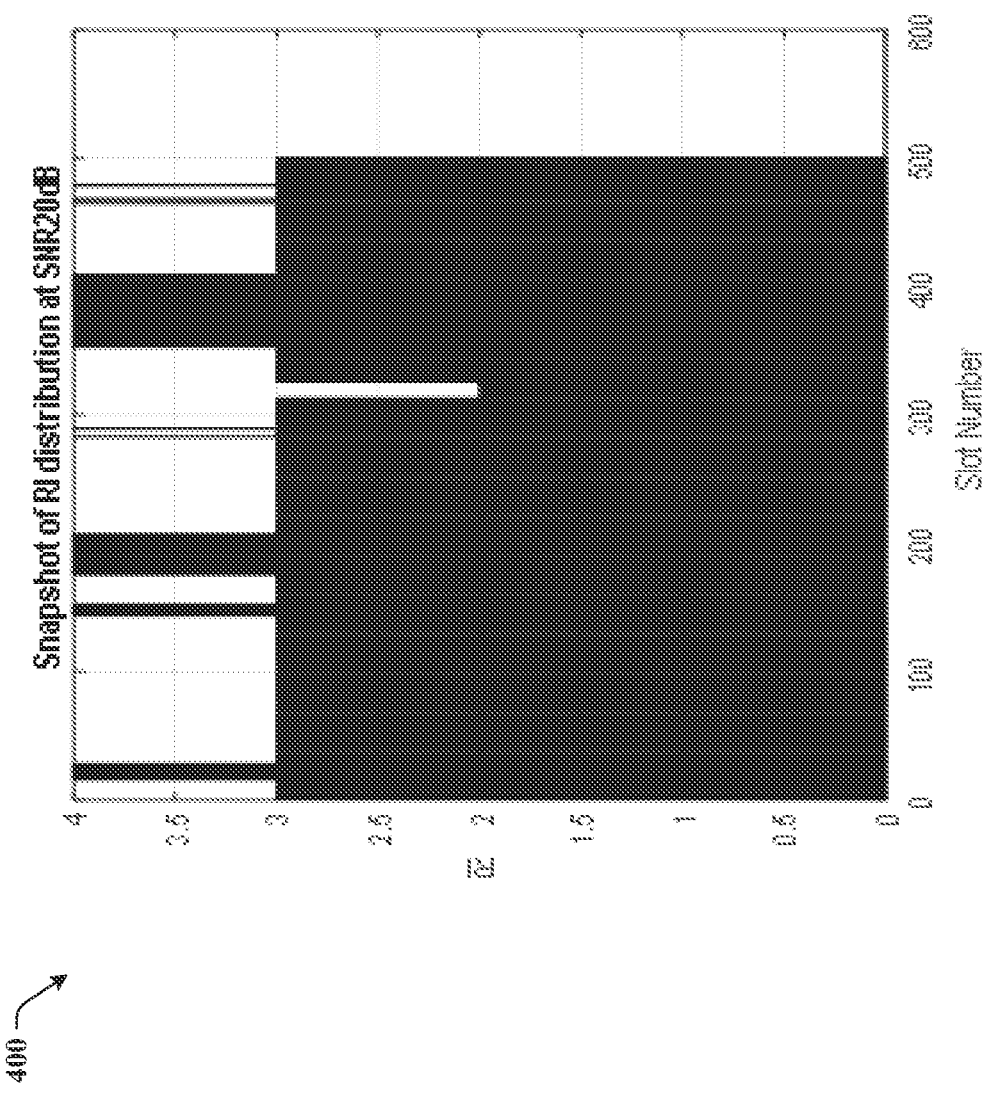
FIG. 4 illustrates an example graph of rank information distribution according to one or more embodiments.
Figure 5:
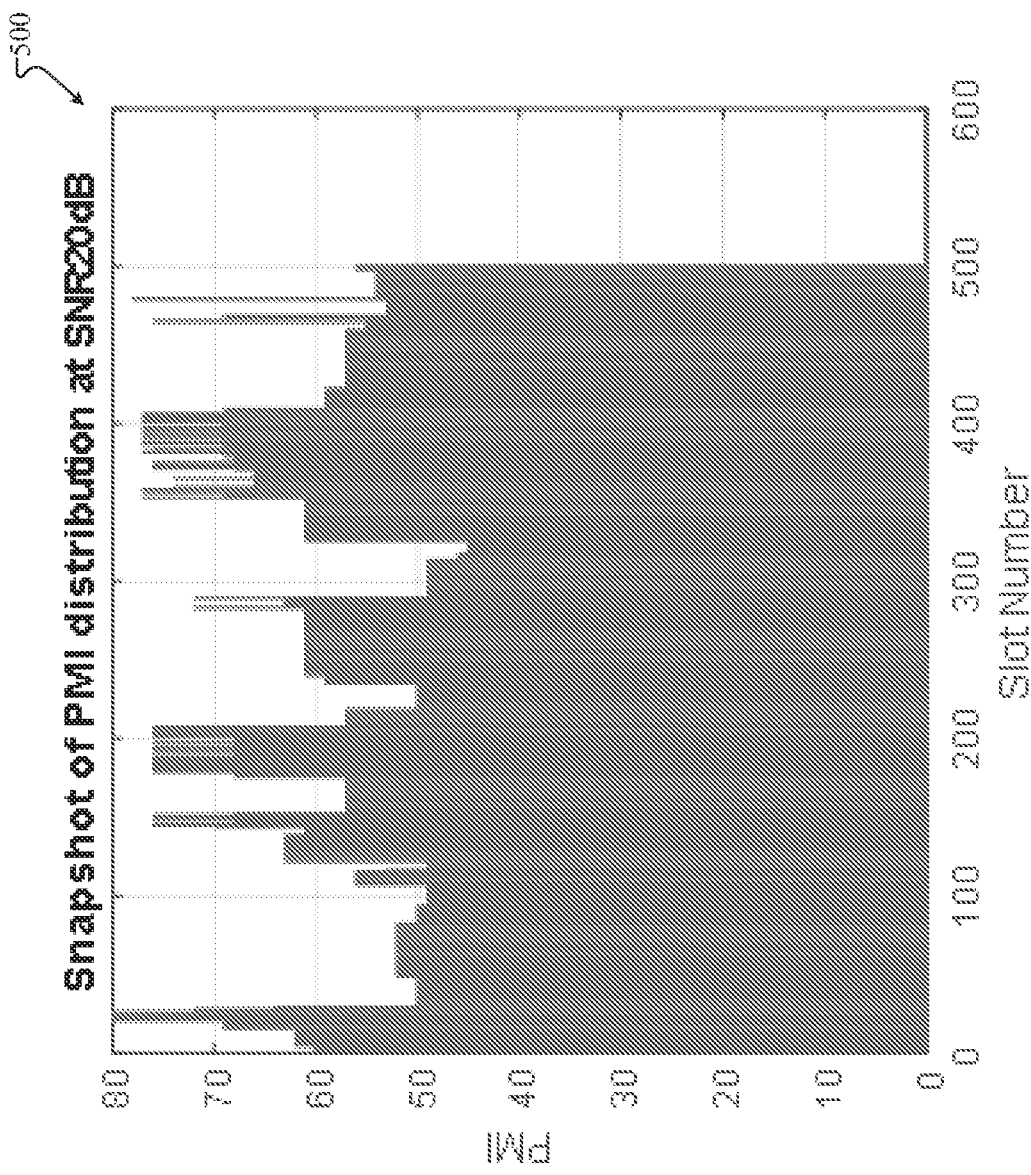
FIG. 5 illustrates an example graph of precoding matrix information distribution according to one or more embodiments.

Referring now to FIG. 4 and FIG. 5, illustrated are example graphs of rank information distribution and of precoding matrix information distribution, respectively, according to one or more embodiments. The motivation behind the proposed techniques are that in general RI computed over the whole bandwidth does not change. Similarly, the PMI computed over the whole bandwidth does not change as shown in FIG. 4 and FIG. 5, respectively. Thus, if the UE 102 can compute the CSI using DMRS based channel estimation for the scheduled rank and scheduled PMI, the CQI computed can be similar to that of CSI-RS based channel estimation. Therefore, the UE 102 can use channel estimation from DM-RS or physical downlink shared channel (PDSCH) based channel estimation for computing the CQI, and the UE 102 can estimate CSI during the PDSCH decoding time. Furthermore, the UE 102 can decode PDSCH as wells as compute the CQI in the same slot. The possible CSI parameters with this technique are wideband CQI, sub band CQI, and the layer indicator.

Figure 6:
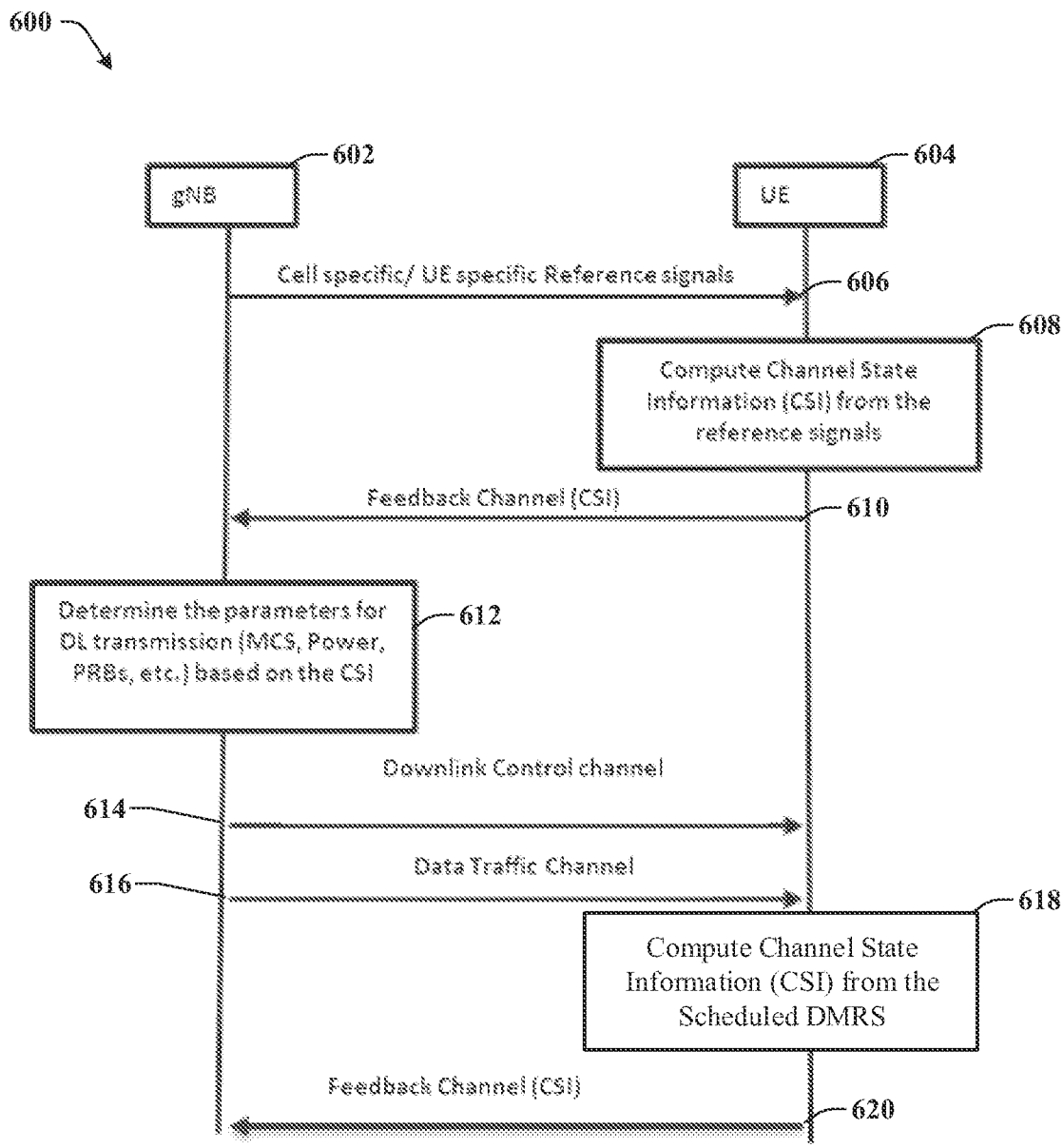
FIG. 6 illustrates an example message sequence chart according to one or more embodiments.

Referring now to FIG. 6, illustrated is an example message sequence chart 600 according to one or more embodiments. A gNB/base station device/network node device 602 can send a cell specific or UE specific reference signal at 606 to a UE 604. The reference signal 606 can include a CS-RS signal, and then at 608, the UE 604 can calculate CSI including PMI and RI, and then feed the info back to the gNB 602 at 610. The gNB 602 can then determine the parameters for a PDSCH transmission, communicate the parameters to the UE 604 in a downlink control channel 614, and then transmit data via a data traffic channel 616. The UE 102, 104 can then calculate the CSI including the LI and CQI from a scheduled DM-RS while the data is being decoded at 618, and then feed the CSI back at 620 to the gNB 602 along with the HARQ-ACK or HARQ-NACK.

In general, RI computed over the bandwidth does not change. Similarly, the PMI computed over the bandwidth does not change frequently. Hence, if the UE 604 can compute the CSI using DMRS based channel estimation for the scheduled rank and scheduled PMI, the CQI computed can be similar to that of CSI-RS based channel estimation. Hence the UE 604 can use channel estimation from DM-RS or PDSCH based channel estimation for computing the CQI. The UE 604 can estimate CSI during the PDSCH decoding time. The UE 604 can also decode PDSCH and compute the CQI in the same slot.

The UE 604 can use DMRS and/or PDSCH to compute CSI for the scheduled number of layers and the precoding. Once it estimates the channel, it can compute the signal to interference noise ratio (SINR) using the following expression (for MMSE based detector) and computes the CQI:

$$SINR_i = H_i S^{-1} H_i;$$

$$S = N_0 R_N + HH^H - H_i^* H_i^H \qquad \text{Equation 2:}$$

Once the UE 604 computes the CQI using DMRS based channel estimation, the UE 604 can report the CQI to the network along with HARQ-ACK. In one embodiment, the UE 604 can report separately encoded CQI to the node device 602. In another embodiment the UE 604 can report joint encoding HARQ-ACK and CQI. In yet another embodiment, the UE 604 can use separate sequences (e.g., Cazac sequence) to indicate the HARQ-ACK and use differential CQI to indicate the simultaneous HARQ-ACK and CSI. The differential CQI is defined as:

$$\text{Offset level }(s) = \text{CQI index computed using CSI-RS} - \text{CQI index computed using DM-RS} \quad \text{Equation 3:}$$

After receiving this value, the UE reports the sub band differential CQI according to Table 5:

TABLE 5

Proposed Mapping of HARQ-ACK and CQI to Offset Level

| Sequence | HARQ-ACK | Offset level |
|---|---|---|
| Sequence1 | ACK | 0 |
| Sequence2 | ACK | 1 |
| Sequence3 | ACK | ≥2 |
| Sequence4 | ACK | ≤−1 |
| Sequence5 | NAK | 0 |
| Sequence6 | NAK | 1 |
| Sequence7 | NAK | ≥2 |
| Sequence8 | NAK | ≤−1 |

By using DMRS based CSI, the PMI and RI are held constant. However, in general, for high speed UEs, the rank/PMI information can change rapidly. In these cases, the use of DMRS based channel estimation cannot be useful. Thus, the network can indicate whether it wants the UE 604 to perform CSI calculation using DM-RS by use of a single bit in the downlink control channel for requesting the CSI using DMRS. In another embodiment the network can indicate via higher layer signaling (e.g., RRC signaling) to the UE 604 to enable/disable DMRS based CSI.

Figure 7:
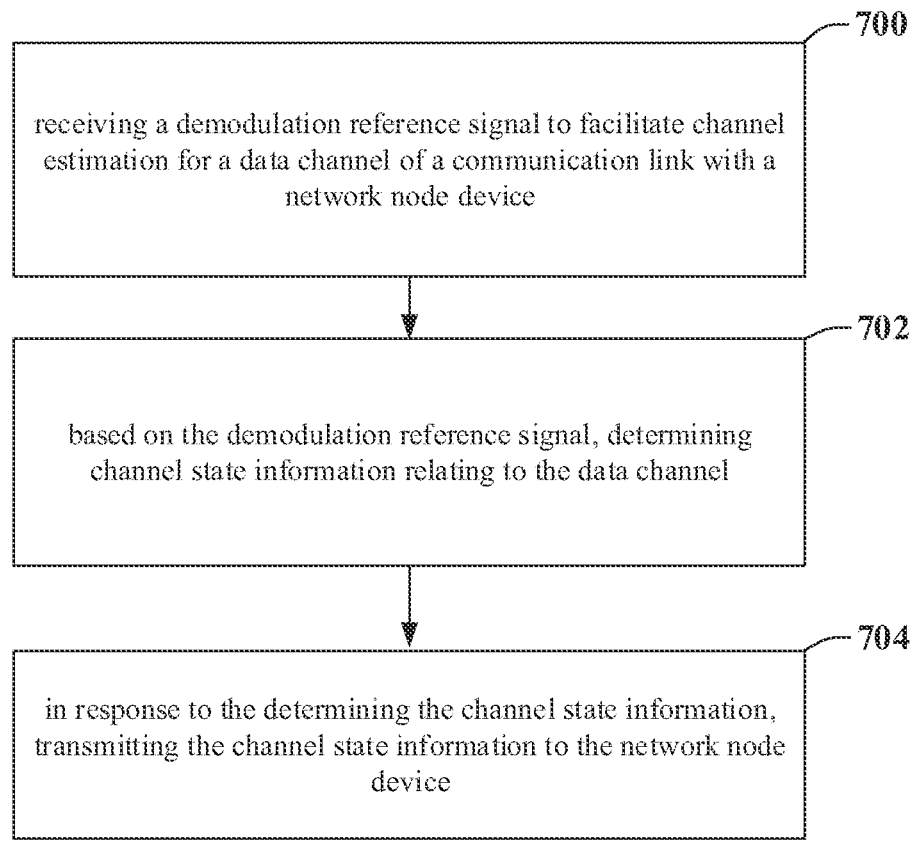
FIG. 7 illustrates an example flow diagram for a user equipment device for facilitating fast CSI computation for a 5G network according to one or more embodiments.

Referring now to FIG. 7, illustrated is an example flow diagram for a user equipment device for facilitating fast CSI computation for a 5G network according to one or more embodiments. At element 700, a user equipment device that can facilitate performance of operations comprising receiving a demodulation reference signal to facilitate channel estimation for a data channel of a communication link with a network node device. Based on the demodulation reference signal, at element 702, the user equipment device can facilitate performance of operations comprising receiving determining channel state information relating to the data channel. Additionally, in response to the determining the channel state information, at element 704, the user equipment device can facilitate performance of operations comprising transmitting the channel state information to the network node device.

Figure 8:
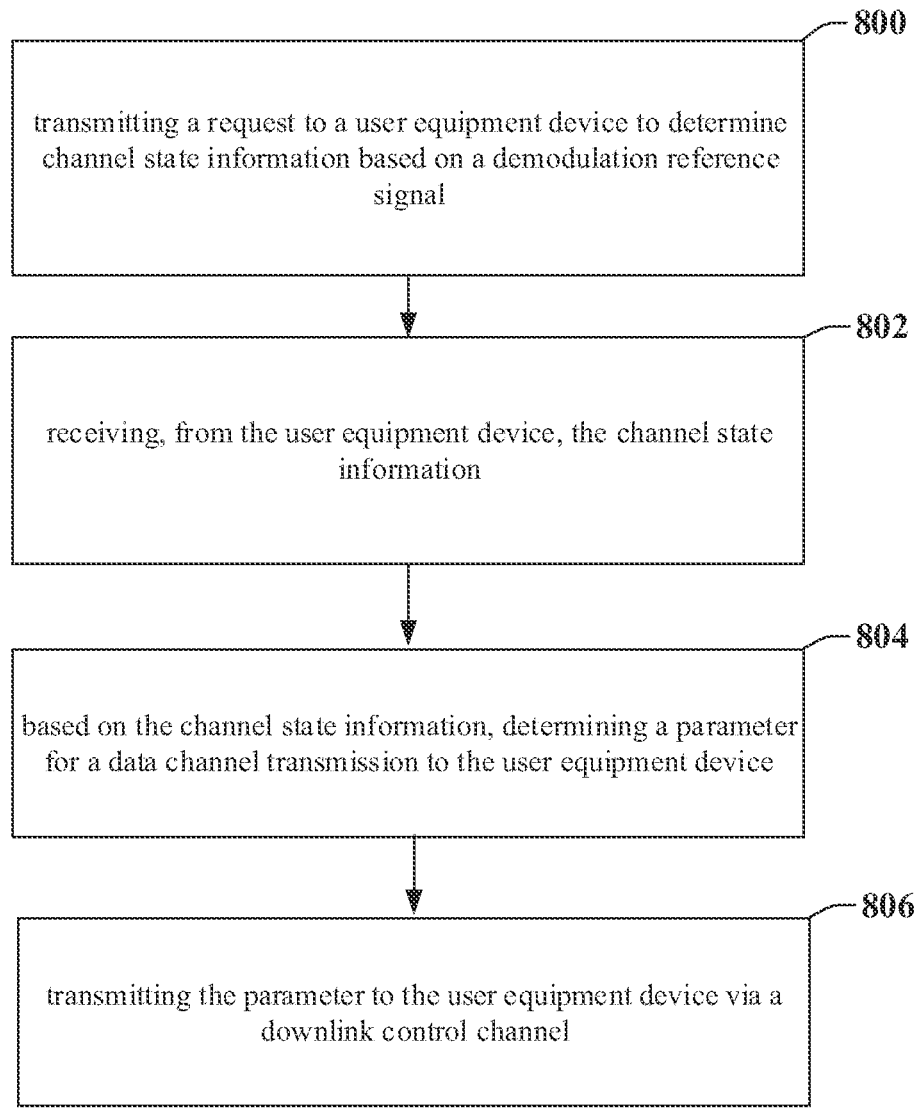
FIG. 8 illustrates an example flow diagram for a network node device for facilitating fast CSI computation for a 5G network according to one or more embodiments.

Referring now to FIG. 8, illustrated is an example flow diagram for a network node device for facilitating fast CSI computation for a 5G network according to one or more embodiments. At element 800, the node device can facilitate performance of operations comprising transmitting a request to a user equipment device to determine channel state information based on a demodulation reference signal. At element 802, the node device can facilitate performance of operations comprising receiving, from the user equipment device, the channel state information. Based on the channel state information, at element 804, the node device can facilitate performance of operations comprising determining a parameter for a data channel transmission to the user equipment device. Furthermore, at element 806, the node device can facilitate performance of operations comprising transmitting the parameter to the user equipment device via a downlink control channel.

Figure 9:
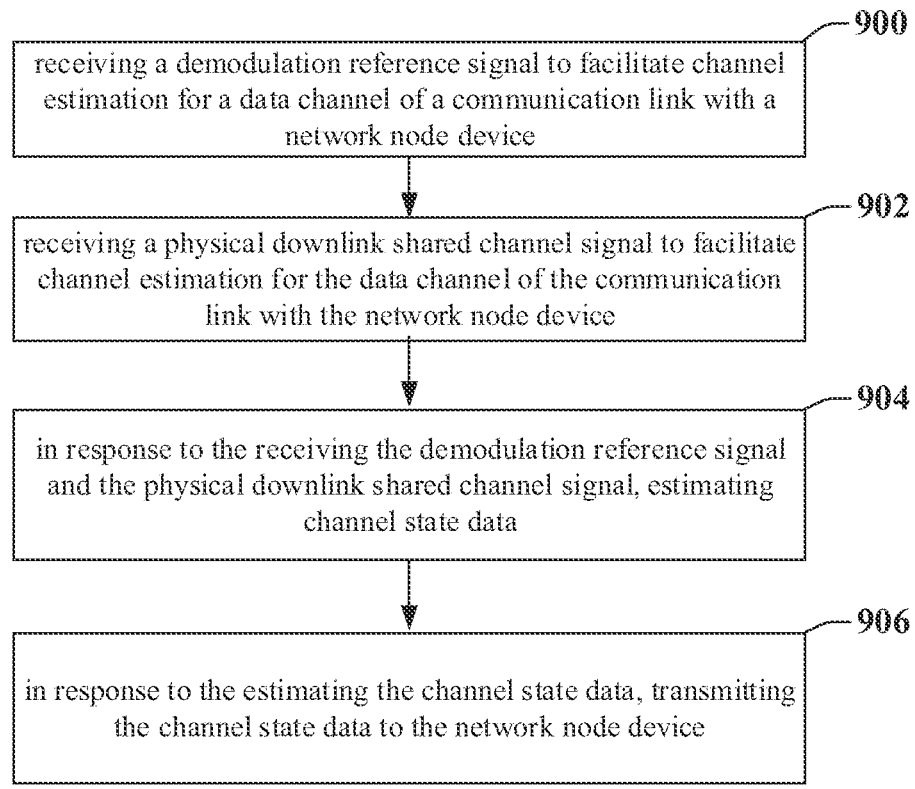
FIG. 9 illustrates an example flow diagram for a machine-readable medium for facilitating fast CSI computation for a 5G network according to one or more embodiments.

Referring now to FIG. 9, illustrates an example flow diagram for a machine-readable medium for facilitating fast CSI computation for a 5G network according to one or more embodiments. At element 900, a machine-readable storage medium can perform the operations comprising receiving a demodulation reference signal to facilitate channel estimation for a data channel of a communication link with a network node device. At element 902, the machine-readable storage medium can perform the operations comprising receiving a physical downlink shared channel signal to facilitate channel estimation for the data channel of the communication link with the network node device. In response to the receiving the demodulation reference signal and the physical downlink shared channel signal, at element 904, the machine-readable storage medium can perform the operations comprising estimating channel state data. Additionally, in response to the estimating the channel state data, at element 906, the machine-readable storage medium can perform the operations comprising transmitting the channel state data to the network node device.

Figure 10:
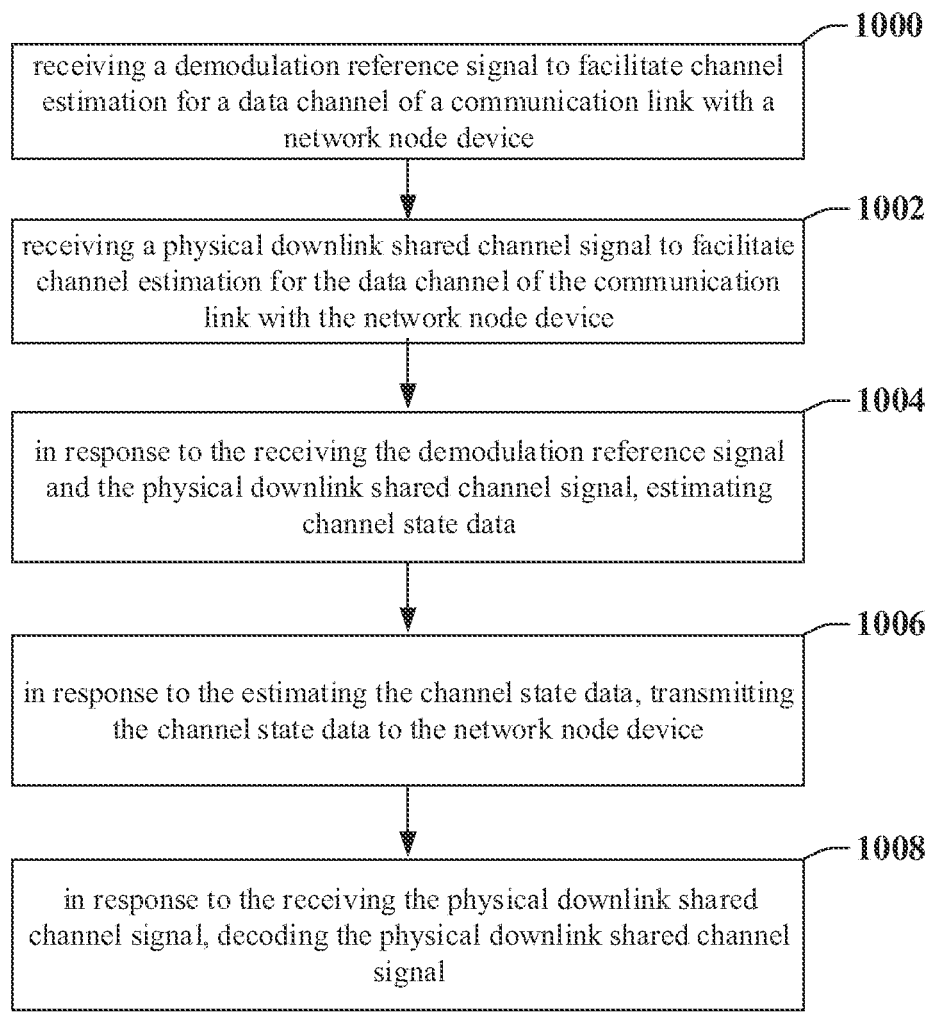
FIG. 10 illustrates an example flow diagram for a machine-readable medium for facilitating fast CSI computation for a 5G network according to one or more embodiments.

Referring now to FIG. 10, illustrated is an example flow diagram for a machine-readable medium for facilitating fast CSI computation for a 5G network according to one or more embodiments. At element 1000, a machine-readable storage medium can perform the operations comprising receiving a demodulation reference signal to facilitate channel estimation for a data channel of a communication link with a network node device. At element 1002, the machine-readable storage medium can perform the operations comprising receiving a physical downlink shared channel signal to facilitate channel estimation for the data channel of the communication link with the network node device. In response to the receiving the demodulation reference signal and the physical downlink shared channel signal, at element 1004, the machine-readable storage medium can perform the operations comprising estimating channel state data. Additionally, in response to the estimating the channel state data, at element 1006, the machine-readable storage medium can perform the operations comprising transmitting the channel state data to the network node device. Furthermore, in response to the receiving the physical downlink shared channel signal, at element 1008, the machine-readable storage medium can perform the operations comprising decoding the physical downlink shared channel signal.

Figure 11:
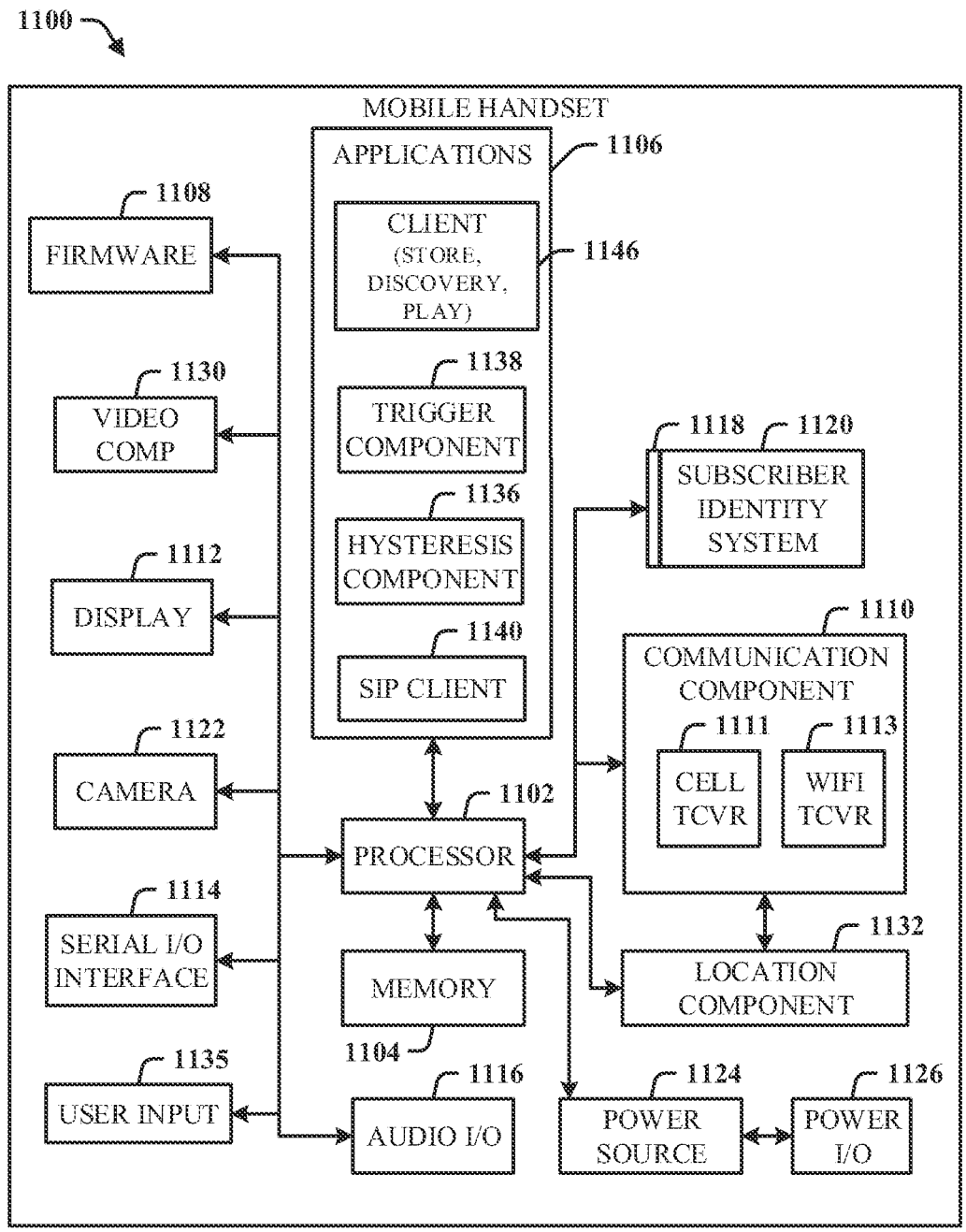
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
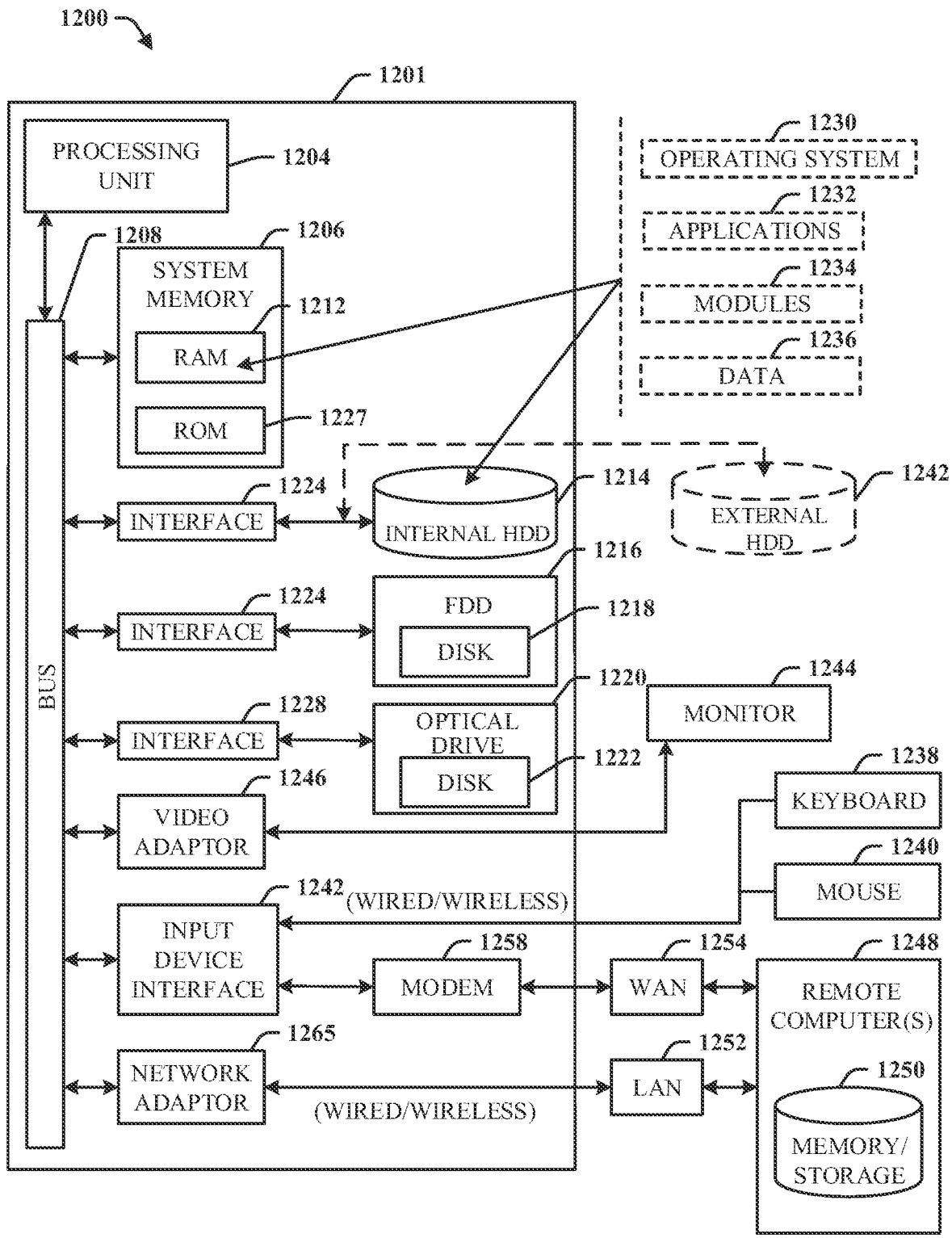
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

For CSI reporting a reference signal can be used for estimating the channel between the UE and the gNB. A report setting can inform the resources used for reporting CSI. Existing configurations involve lot of overhead and waste of resources, which, in turn reduces the resources allocated for data traffic channel. In addition, the existing framework for CSI computation involves latency as the UE needs to check the CSI-RS (which can be periodic) and compute/report the CSI periodically. Thus, a huge delay, which impacts delay sensitive applications such as URLLC, is involved in using the CSI reported by the UE. Thus, an efficient solution is needed to report the CSI for future generation wireless communication systems.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A user equipment, comprising:
   a processor; and
   a memory that stores executable instructions that, when executed by the processor, facilitate performance of operations, comprising:
      based on a demodulation reference signal, utilized to facilitate channel estimation for a data channel of a communication link with network equipment, and an estimation of a physical downlink shared channel, determining channel state information relating to the data channel;

decoding the physical downlink shared channel and a channel quality indicator in a same slot;

in response to determining the channel state information, transmitting the channel state information to the network equipment, wherein transmitting the channel state information comprises transmitting wideband channel state information associated with a wideband configuration via radio resource control signaling;

determining sub-band channel state information associated with the communication link, wherein a sub-band size is configured based on a number of physical resource blocks;

in response to determining the sub-band channel state information, determining an offset value representative of a difference between a wideband channel quality indicator and a sub-band channel quality indicator;

mapping two bit sub-band differential channel quality indicator values to the offset value; and in response to determining the offset value, transmitting the offset value to the network equipment.

2. The user equipment of claim 1, wherein the channel state information comprises a layer indicator and the channel quality indicator.

3. The user equipment of claim 1, wherein determining the channel state information is in response to an instruction received from the network equipment.

4. The user equipment of claim 1, wherein the operations further comprise:
receiving an instruction from the network equipment that prompts to perform the determining of the channel state information.

5. The user equipment of claim 1, wherein the operations further comprise:
receiving an instruction from the network equipment via a downlink control channel associated with the communication link.

6. The user equipment of claim 1, wherein determining the channel state information is performed concurrently with a decoding of data received via the data channel.

7. The user equipment of claim 1, wherein transmitting the channel state information further comprises transmitting the channel state information with an indication that data received via the data channel was decoded successfully.

8. The user equipment of claim 1, wherein the operations further comprise:
transmitting indication data representative of an indication of a hybrid automatic repeat request.

9. The user equipment of claim 1, wherein the operations further comprise:
transmitting the channel state information with an indication of a hybrid automatic repeat request in separate reports respectively for the channel state information and the indication.

10. The user equipment of claim 1, wherein the operations further comprise:
transmitting the channel state information with an indication of a hybrid automatic repeat request in a joint report comprising the channel state information and the indication.

11. The user equipment of claim 1, wherein transmitting the channel state information further comprises transmitting the channel state information with an indication that data received via the data channel was not decoded successfully.

12. The user equipment of claim 1, wherein the operations further comprise:
based on a channel state information reference signal, generating a value associated with the channel quality indicator.

13. The user equipment of claim 1, wherein the operations further comprise:
based on the demodulation reference signal, generating a value associated with the channel quality indicator.

14. Network node equipment, comprising:
a processor; and
a memory that stores executable instructions that, when executed by the processor, facilitate performance of operations, comprising:
receiving, from a user equipment, channel state information, wherein the channel state information comprises wideband channel state information associated with a wideband configuration that has been transmitted via radio resource control signaling;
based on the channel state information, determining a parameter for a data channel transmission to the user equipment;
transmitting the parameter to the user equipment via a downlink control channel;
determining, by the user equipment, wideband channel state information and sub-band channel state information associated with a communication link, wherein a sub-band size is configured based on a number of physical resource blocks;
receiving an offset value from the user equipment, wherein the offset value is based on a difference between a wideband channel quality indicator and a sub-band channel quality indicator; and
mapping two bit sub-band differential channel quality indicator values to the offset value.

15. The network node equipment of claim 14, wherein the channel state information comprises a layer indicator and a channel quality indicator.

16. The network node equipment of claim 14, wherein the operations further comprise:
determining to send a request based on a variability of a precoding matrix indicator and a rank indicator of a communication link with the user equipment over a predefined period of time.

17. The network node equipment of claim 14, wherein the operations further comprise:
determining to send a request based on a velocity of the user equipment being determined to be above a defined threshold velocity.

18. A non-transitory machine-readable medium, comprising executable instructions that, when executed by a processor, facilitate performance of operations, comprising:
receiving a physical downlink shared channel signal to facilitate channel estimation for a data channel of a communication link with network equipment;
based on a demodulation reference signal and the physical downlink shared channel signal, estimating channel state data;
decoding the physical downlink shared channel signal and a channel quality indicator in a same slot;
in response to estimating the channel state data, transmitting the channel state data to the network equipment, wherein the transmitting comprises transmitting, via radio resource control signaling, wideband channel state data associated with a wideband configuration;
determining sub-band channel state data associated with the communication link;
in response to determining the sub-band channel state data, determining an offset value, wherein the offset value is a difference between a wideband channel quality indicator and a sub-band channel quality indicator; and mapping two bit sub-band differential channel quality indicator values to the offset value.

19. The non-transitory machine-readable medium of claim 18, wherein estimating the channel state data comprises estimating the channel state data during a decoding time associated with the physical downlink shared channel.

20. The non-transitory machine-readable medium of claim 18, wherein the operations further comprise:

in response to receiving the physical downlink shared channel signal, decoding the physical downlink shared channel signal.

\* \* \* \* \*